(12) United States Patent
Winterowd

(10) Patent No.: US 6,841,611 B2
(45) Date of Patent: Jan. 11, 2005

(54) LABELING PAINT AND METHOD FOR THE MANUFACTURE THEREOF

(75) Inventor: Jack G. Winterowd, Puyallup, WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 10/405,834

(22) Filed: Apr. 2, 2003

(65) Prior Publication Data

US 2003/0204009 A1 Oct. 30, 2003

Related U.S. Application Data

(60) Division of application No. 09/943,885, filed on Aug. 30, 2001, now abandoned, which is a continuation-in-part of application No. 09/829,508, filed on Apr. 9, 2001.
(60) Provisional application No. 60/207,085, filed on May 25, 2000.

(51) Int. Cl.[7] .......................... C08K 3/22; C08L 33/08; C08L 33/10; C08L 33/12
(52) U.S. Cl. ........................................ 524/497; 524/560
(58) Field of Search ................................ 524/497, 556, 524/560; 106/436

(56) References Cited

U.S. PATENT DOCUMENTS

| | | | |
|---|---|---|---|
| 2,374,678 A | | 5/1945 | Gruenwald |
| 3,894,976 A | * | 7/1975 | Kang et al. .................... 524/27 |
| 3,951,899 A | | 4/1976 | Seiner |
| 3,959,224 A | * | 5/1976 | Coleman ..................... 526/304 |
| 4,045,393 A | * | 8/1977 | Krevenas et al. ............ 524/272 |
| 4,265,797 A | * | 5/1981 | Suk ............................. 524/389 |
| 4,521,489 A | | 6/1985 | Rehfuss et al. |
| 4,792,357 A | | 12/1988 | Bier |
| 5,445,754 A | * | 8/1995 | Nelson ......................... 252/62 |
| 5,510,409 A | | 4/1996 | Romano |
| 5,700,522 A | | 12/1997 | Nonweiler et al. |
| 6,013,721 A | * | 1/2000 | Schall et al. ................. 524/555 |
| 6,069,189 A | | 5/2000 | Kramer et al. |
| 6,608,131 B1 | * | 8/2003 | Winterowd et al. ......... 524/487 |
| 2003/0110101 A1 | * | 6/2003 | Friel et al. ..................... 705/28 |

FOREIGN PATENT DOCUMENTS

EP  625541 A2 * 11/1994

* cited by examiner

Primary Examiner—Callie Shosho
(74) Attorney, Agent, or Firm—Christensen O'Connor Johnson Kindness PLLC

(57) ABSTRACT

The present invention provides a stable, labeling paint suitable for use on an OSB finishing line in conjunction with metal stencils, and a method for making the labeling paint.

32 Claims, No Drawings

LABELING PAINT AND METHOD FOR THE MANUFACTURE THEREOF

CROSS-REFERENCE TO RELATED APPLICATIONS

This application is a divisional of U.S. patent application No. 09/943,885, filed Aug. 30, 2001, now abandoned which is a continuation-in-part of U.S. patent application No. 09/829,508, filed Apr. 9, 2001, which claims the benefit of U.S. patent application No. 60/207,085, filed May 25, 2000, now abandoned. The benefit of the filing date of each is hereby claimed under 35 U.S.C. §§120 and 119, respectively. Each of these application is incorporated herein by reference in its entirety.

FIELD OF THE INVENTION

The present invention relates to a labeling paint composition and method for its manufacture.

BACKGROUND OF THE INVENTION

Most manufacturers of oriented strandboard (OSB) panels in North America use a common practice of bundling and packaging multiple panels into units in preparation for shipment to distributors, retailers and lumberyards. Units are composed of a stack of about 40 to 100 panels. Typically the individual panels are 4 feet wide, and 8 feet or 16 feet long. Individual panel thickness values range between 0.225 inch to 1.25 inches. Most units are between 3 to 4 feet in height and so the number of panels in a unit is largely determined by the thickness of the individual panels.

OSB units are typically subjected to a finishing process that generally includes the following three steps. First, units are transported into a booth where the four sides of the unit are sprayed with a liquid edge sealant, which dries to form a hydrophobic coating that helps to reduce edge thickness swell if the panels are exposed to rain at construction site. Quite often the liquid edge sealant is colored to visually differentiate the product in the marketplace. Then, the sealed unit is strapped to secure the bundle during shipping and storage. Finally, the sealed and strapped unit is labeled (e.g., stenciled) to designate the panel manufacturer, as well as the number, type and size of panels in the unit. Labeling is usually done in one of two ways. Units based on the most premium panels are often wrapped in a high-basis weight packaging paper that has a sophisticated, highly decorative label printed on the outside. The packaging paper serves a protective as well as a labeling function, and in some cases this combination of attributes has been worth the added cost. Most OSB units are not wrapped in packaging material, but are instead labeled with a relatively simple stencil and paint system.

In the stencil and paint labeling system, a stencil is placed against the side of a sealed and strapped OSB unit and paint is sprayed through the stencil onto the side of the unit. Generally the stencil is composed of steel or aluminum and is designed to create images of letters, numbers, and company logos or icons on the side of the unit. Some of these designs can be a bit intricate, especially around the letters and numbers. The metal around these intricate areas generally exists as narrow, strips, which are delicate and will bend or break with excessive mechanical stress.

Conventional labeling paint for an OSB finishing line, such as High-Hide White Stencil Paint, which is produced by Associated Chemists Inc. (ACI) [Portland, Oreg.], has a color that sharply contrasts with the color of the edge sealant. Effective contrasting color selection of the edge sealant and stencil paint provides a visually appealing, dramatic appearance to the unit.

Conventional labeling paints are designed to be very low in viscosity in order to improve the atomization properties of the paint at low spray pressure settings. Low spray pressure settings are generally used to minimize the amount of overspray that accumulates on the stencil. The low viscosity of conventional labeling paint makes it very prone to dripping. Accumulated overspray on the stencil often drips into some of the intricate stencil voids where it dries and occludes the opening. To cope with this dripping problem, operators on the OSB finishing line are generally forced to clean the stencil once every 20 to 25 minutes. In some cases operators apply heat to the stencil in an attempt to dry the accumulating paint before it has a chance to drip. Heating has marginally improved the dripping problems on some finishing lines, but it increases the complexity of the operation and it represents a burn hazard to the operators. Heating can also increase the strength of the bond between the paint and the metal as the paint dries. Unfortunately, conventional labeling paint forms a strong bond to the metal as it dries and operators must scrape with considerable force in order to remove it. Eventually, the harsh scraping action destroys the most delicate parts of the stencil.

Accordingly, there exists a need for a better labeling paint for an OSB finishing line. The ideal labeling paint has the following attributes.

Regulatory compliance: The labeling paint is water-based and should not contain any highly toxic or hazardous components.

Formulation stability: The labeling paint should not exhibit any phase separation or sediment formation during storage (the ACI labeling paint exhibits gross sediment formation unless it is frequently agitated).

Sprayability: The labeling paint is readily atomized in a spray system and should be resistant to nozzle clogging.

Bleed resistance with edge sealant: Usually, the edge sealant is still wet when the labeling paint is applied over it. Because these materials typically have sharply contrasting colors, it is important that they do not bleed into each other.

Ability to wet-out edge sealant: The edge sealant generally contains a high level of waxes and it becomes very hydrophobic as it dries. The labeling paint must wet-out the surface of the edge sealant and develop adequate bond strength to the edge sealant as it dries.

No dripping: The labeling paint should not drip into the openings (e.g., letters or numbers) on the stencil prior to drying.

Film Formation: The labeling paint should form a film as it dries and should not remain wet and sticky for very long subsequent to application.

Weak bond to metal stencil: The labeling paint must form a very weak bond to the metal stencil in order to ensure its easy removal from the stencil.

Appearance: The labeling paint should provide an image, symbol, or icon that is visually intense and saturated even when the labeling paint is used at low application rates.

SUMMARY OF THE INVENTION

The present invention provides a labeling paint and method for its manufacture.

In one aspect, the invention provides a stable, labeling paint suitable for use on an OSB finishing line in conjunction with metal stencils. The labeling paint is typically applied to the side of units at spread rates of about 10 to about 300 g/m². The labeling paint overspray that accumulates on the stencil is highly resistant to dripping and dries to form a soft film that has sufficient bond strength to the edge sealant. The labeling paint is easily removed from the metal stencil even after excessive drying times. The labeling paint is water-based and can include opacifying agents, viscosity enhancing agents, surfactants, a polymeric binding agent with a glass transition temperature that is greater than about 25° C., and a debonding agent, which is active on metal surfaces.

In another aspect of the invention, a method for preparing a labeling paint is provided. In the method, a stable emulsion is prepared under relatively high shear conditions in a first stage. The emulsion includes water and a debonding agent that is active on metal surfaces. In the second stage of the method, the emulsion is combined with a suspension under relatively low shear conditions to provide the paint. The suspension includes a polymeric binder having a glass transition temperature greater than about 25° C.

DETAILED DESCRIPTION OF THE PREFERRED EMBODIMENT

In one aspect, the present invention provides a stable, water-based, labeling paint suitable for use on an OSB finishing line in conjunction with metal stencils. The paint exhibits no sediment formation or phase separation for about at least two months when stored in a closed container at a temperature of about 20° C. The paint can be transferred from a reservoir into a spray gun with conventional pumps and hoses. The paint will not clog nozzles even after extended stop-and-start run times. The paint is typically applied to the side of units of OSB at spread rates of about 10 to about 300 g/m², and at these spread rates it does not bleed excessively into previously applied wet edge sealant. The paint adequately wets-out the surface of previously applied edge sealant and forms a bond with the edge sealant that is sufficient for normal field conditions. The paint is highly resistant to dripping on the stencil, and it is easily removed from the stencil even after excessive drying times of about 24 hours.

In one embodiment, the labeling paint is water-based and contains coloring and/or opacifying agents at a combined level of about 0.5 to about 35% by weight of the formulation; viscosity enhancing agents at a level of about 0.5 to about 10% by weight of the formulation; surfactants at a level of about 0.5 to about 5% by weight of the formulation; a polymeric binding agent at a level of about 3 to about 30% by weight of the formulation; and a debonding agent, which is active on metal surfaces, at a level of about 10 to about 50% by weight of the formulation. The paint can also contain preservatives, optical brighteners, plasticizers, dispersing aids, coalescing agents, and defoaming agents.

Titanium dioxide is a suitable opacifying agent. Viscosity enhancing agents are exemplified by soluble nonionic polysaccharides, such as hydroxyethylcellulose or carboxymethylcellulose. However, suspended particle-type viscosity enhancing agents, such as fumed silica, may also be used in this invention. Nonionic and anionic surfactants can be used in this formulation. A suitable anionic surfactant class is based on the salts derived from morpholine and long-chain carboxylic acids, such as stearic acid, palmitic acid, or myristic acid. Suitable polymeric binding agents include latices with glass transition temperatures that are greater than about 25° C. In one embodiment, the polymeric binder is a latex based on a copolymer of butylacrylate and methyl methacrylate with a glass transition temperature of about 32° C. and a pH from about 8 to about 9. Effective debonding agents include vegetable oils such as soybean oil, corn oil, sunflower oil, castor oil, rapeseed oil, linseed oil, sunflower seed oil, or safflower oil. Soybean oil is highly preferred for its low odor, low color, availability, and low cost. Silicone oils and mineral oils can also be used as debonding agents. A suitable defoaming agent is a non-silicone defoaming (e.g., Surfynol DF-210 commercially available from Air Product, Allentown, Pa.). Suitable preservatives include a mixture of 1-(3-chloroallyl)-3,5,7-triaza-1-azoniaadamantane chloride (64%); sodium bicarbonate (33%); hexamethylenetetramine (2%), and water (1%), commercially available under the designation Dowicil 75. Suitable dispersing aids include acetylenic diols, for example, 2,4,7,9-tetramethyl-5-decyne-4,7-diol, commercially available under the designation Surfynol 104PA. Associative thickeners can also be included in the paint, including, for example, a polyether polyurethane urea solution in a mixture of water and diethylene glycol monobutyl ether, commercially available under the designation Rheolate 288. Suitable coalescing agents include substituted glycols, for example, 2,2,4-trimethyl-1,3-pentanediol mono (2-methylpropanoate), commercially available under the designation Texanol.

In another aspect, the present invention provides a method for making a labeling paint. In one embodiment, the labeling paint is made in two stages. In a first stage a stable emulsion is formed under high shear conditions. The emulsion includes water and a debonding agent that is active on metal surfaces. In one embodiment, the emulsion includes water, one or more viscosity enhancing agents, one or more surfactants, and one or more debonding agents. In the second stage, the emulsion is combined with a suspension under relatively low shear conditions to provide the labeling paint. The suspension includes water and a polymeric binder having glass transition temperature (Tg) greater than about 25° C. In one embodiment, the suspension includes water, one or more polymeric binders, and one or more opacifying agents.

In one embodiment, the method of the invention involves an initial step in which a stable emulsion is produced using mixing equipment that provides a relatively high shearing action. In one embodiment, the emulsion includes water, a viscosity enhancing agent, a surfactant and a debonding additive that is active on metal surfaces. Other compounds that can also be incorporated into the emulsion include preservatives, defoaming agents, and stabilizers.

Suitable viscosity enhancing agents include nonionic polysaccharides, such as hydroxyethylcellulose and carboxymethylcellulose. Nonionic and anionic surfactants can also be used for this invention. In one embodiment, the emulsion includes an anionic surfactant that is based on a long-chain fatty acid and an amine, such as morpholine or triethanolamine.

Suitable debonding agents include vegetable oils, such as soybean oil, and those noted above. Silicone oil or mineral oil or mixtures of oils can also be used as debonding agents.

Polyols and long chain alcohols, such as stearyl alcohol and isostearyl alcohol, can be used to stabilize the emulsion and increase its viscosity. These alcohols may also ultimately promote the release of the labeling paint formulation from the metal stencil.

In one embodiment, the emulsion composition includes water (from about 38.0 to about 93.9%), a viscosity enhancing agent (from about 0.1 to about 2.0%), a surfactant (from about 1 to about 10%) and a debonding agent active on metal surfaces (from about 5.0 to about 50.0%). In another embodiment, the emulsion composition includes water (from about 40.0 to about 60.0%), a viscosity enhancing agent (from about 0.2 to about 1.0%), a preservative (from about 0.01 to about 0.3%), a surfactant (from about 3.0 to about 5.0%), a debonding agent active on metal surfaces (from about 30.0 to about 45.0%), and a stabilizing agent (from about 3.0 to about 6.0%).

As noted above, in one embodiment, the labeling paint can be made by a method having two stages: (1) emulsion formation and (2) emulsion blending. The emulsion can be conveniently prepared with multiple vessels. For example, in one vessel a mixture of the debonding agent and other water insoluble materials are combined. It is convenient to add long chain fatty acids and stabilizing agents to this vessel. In many cases this mixture is stirred and heated to a temperature sufficient to melt any solid components in the mixture. Once all of the materials are in a liquid state, mild agitation is sufficient to achieve a homogenous mixture. The molten mixture can be cooled to room temperature without freezing. In a second vessel an aqueous solution is prepared by agitating a mixture of water and viscosity enhancing agent. It is usually advantageous to add a preservative and an amine to this aqueous phase with additional stirring until a single-phase solution has been achieved. At this point, the aqueous phase and the debonding agent mixture can be combined. The combination provides a relatively stable emulsion with minimal agitation. The resulting combination can then be subjected to a period of high-shear mixing. For instance, it is quite appropriate to subject the mixture to a homogenizer, which applies shear to the mixture under high pressure. This results in a finely dispersed, stable emulsion with minimal froth. Other techniques can be used to establish a finely dispersed emulsion, but the formation of froth should generally be minimized. The resulting emulsion has a viscosity that is generally in the range of from about 500 to about 5000 cps and is stable with respect to phase separation. Thus, the emulsion so produced can be shipped to another processing center and/or stored for prolonged periods of time.

In a second stage of the method, the emulsion is blended under relatively low shear mixing conditions with a previously dispersed opacifying agent and a polymeric binder having a glass transition temperature greater than about 25° C. In certain embodiments, additional materials are incorporated into the formulation. These include water, defoaming agents, colorants, viscosity enhancing agents, optical brighteners, plasticizing agents, coalescing agents, dispersing aids, among other additives.

Examples of dispersed or suspended opacifying agents include aqueous titanium dioxide suspensions or organic pigment suspensions. Typically, these suspensions are from about 40 to about 60% solids with an aqueous continuous phase. In many cases these suspensions will contain small amounts of a dispersing aid.

A suitable polymeric binder is an acrylic latex (e.g., butylacrylate/methylmethacrylate copolymer latex) with a glass transition temperature that is greater than about 25° C. and a pH value that is between about 8–10.

Desirable colorants can be based on aqueous colored organic pigment dispersions.

Associative thickeners can be used in this part of the formulation to increase the viscosity.

Coalescing agents, such as ethylene glycol monobutyl ether, can be used to improve the properties of the final formulation.

In one embodiment, the labeling paint includes the emulsion prepared as described above (from about 10.0 to about 55.0%), opacifying pigment dispersion (from about 1.0 to about 50.0%), and a polymeric binder (from about 1.0 to about 50.0%). In another embodiment, the labeling paint includes the emulsion (from about 30.0 to about 45.0%), associative thickener (from about 0.1 to about 1.0%), opacifying pigment dispersion (from about 20.0 to about 40.0%), a polymeric binder (from about 10.0 to about 20.0%), and a coalescing agent (from about 5 to about 15%).

Representative labeling paints, their properties, and methods for their preparation are described in Examples 1 and 2.

The following examples are provided for the purpose of illustrating, not limiting, the invention.

EXAMPLES

Example 1

Representative Labeling Paint Composition, Preparation, Properties and Application A representative labeling paint was prepared as follows. A 200-liter primary mixing vessel was charged with warm water (50° C., 22.50 kg) and a hydroxyethylcellulose powder, known as Natrosol 250 MBR [Herculese, Inc.; Hopewell, Va.] (250 g). The components were agitated by use of a Cowles disperser (6 inch blade, 1000 rpm) for a period of 30 minutes. A 50% morpholine solution (aq) (800 g) was added to the primary mixing vessel and the contents were agitated by use of the Cowles disperser (6 inch blade, 100 rpm) for an additional five minutes. A preservative known as Dowicil 75 [DOW Chemical Inc.; Midland, Mich.] (40 g) was added to the primary mixing vessel and the contents were agitated by use of the Cowles disperser (6 inch blade, 100 rpm) for an additional five minutes. A dispersing aid known as Surfynol 104PA [Air Products and Chemical Corp.; Allentown, Pa.] (300 g) was added to the primary mixing vessel and the contents were agitated by use of the Cowles disperser (6 inch blade, 100 rpm) for an additional five minutes. A titanium dioxide powder, known as Tronox CR-826 [Kerr-McGee Chemical Corp.; Oklahoma City] (17.50 kg) was added to the primary mixing vessel and the contents were agitated by use of the Cowles disperser (6 inch blade, 100 rpm) for an additional 30 minutes. A warm oil mixture (65° C., 21.00 kg) was added to the primary mixing vessel and the contents were agitated by use of the Cowles disperser (6 inch blade, 100 rpm) for an additional 10 minutes. The oil mixture was comprised of a homogenous blend of soybean oil [Archer Daniels Midland Co.; Red Wing, Minn.] (81.67% by weight); a mixture of hydrogenated fatty acids, known as Pristerene 4910 [Unichema International; Chicago, Ill.] (13.33% by weight); 1-octadecanol [Proctor and Gamble; Cincinnati, Ohio] (1.67%. by weight); and a poly(propylene glycol), average MW =1050 Da, known as Pluracol P1010 [BASF Corp.; Wyandotte, Mich.] (3.33% by weight). Warm water (36° C., 13.81 kg) was added to the primary mixing vessel and the contents were manually agitated by use of a paddle in a gentle fashion until the mixture appeared to be homogenous. An acrylic latex, a butylacrylate/methylmethacrylate copolymer latex known as CS-4000 [Rohm and Haas Co.; Philadelphia, Pa.] (12.40 kg) was added to the primary mixing vessel and the contents were manually agitated by use of a paddle in a gentle fashion until the mixture appeared to be homogenous. A defoaming agent known as Surfynol DF-210 [Air Products and Chemical Corp.; Allentown, Pa.] (400 g) was added to the primary mixing vessel and the contents were manually agitated by use of a paddle in a gentle fashion until the mixture appeared to be homogenous. A coalescing agent known as Texanol [Eastman Chemical Co.; Kingsport, Tenn.] (11.00 kg) was added to the primary mixing vessel and the contents were manually agitated by use of a paddle in a gentle fashion until the mixture appeared to be homogenous. The formulation was then filtered through a 20 mesh filter and slowly cooled to 20–25° C.

The labeling paint prepared as described above had a pH value of 8, a percent solids value of 44 to 45, and a specific gravity of 1.09 to 1.13. The Hegman particle size test value was 7+. The Brookfield viscosity value was 5000 cps at a temperature of 24° C.(RVF #7, 50 rpm). An aliquot of the formulation was stored without agitation in a closed container at a temperature of about 20 to about 25° C. for about two months and no sediment formation or phase separation were observed. The color of the formulation was bright white and the odor was slight and pleasant.

The labeling paint described above was shipped to an OSB mill [Weyerhaeuser Co.; Grayling, Mich.] and utilized on the finishing line in place of a conventional labeling paint [High-Hide White Stencil Paint; Associated Chemists Inc.; Portland, Oreg.]. The labeling paint required no agitation in its storage tank, as compared to the High-Hide White Stencil Paint, which required constant agitation. The labeling paint was easily transferred out of its storage tank to a spray gun by use of a 10:1 air motor piston pump. The labeling paint atomized properly as it exited the spray gun. Fewer nozzle clogs per day were reported with the labeling paint than typically observed with the High-Hide White Stencil Paint. The labeling paint did not bleed into the freshly applied green edge sealant on the side of the OSB units, but it did wet-out the surface of the freshly applied green edge sealant in a manner that was sufficient to permit bonding. The edge sealant being used in conjunction with the labeling paint was known as PF6014-34 [Associated Chemists Inc.; Portland, Oreg.]. The visual contrast between the bright white images formed by the labeling paint and the dark green edge sealant as background on the side of the units was dramatic and aesthetically pleasing. The labeling paint that accumulated on the aluminum stencil did not drip into the lettering or logo voids. The operators were able to run the finishing line without cleaning the stencil for four hours at a time. The operators reported that they generally needed to stop and clean the stencil with the High-Hide White Stencil Paint once every 20 to 25 minutes. When the operators did stop to clean the stencil they reported that the labeling paint was much easier and faster to remove than the High-Hide White Stencil Paint. The bond between the dried labeling paint and the stencil was very weak. The labeling paint tended to peal off of the stencil in large sheets and it left a very thin oily residue on the surface of the metal. Overall, the finishing line operators expressed a strong preference for the labeling paint.

Example 2

Representative Labeling Paint Composition, Preparation, Properties, and Application A representative labeling paint was prepared as follows.

Emulsion Formation. An emulsion suitable for use in a representative labeling paint was prepared as follows. A primary mixing vessel was charged with warm water (70° C., 52.85 parts by weight) and a hydroxyethylcellulose powder, known as Natrosol 250 MBR [Herculese, Inc.; Hopewell, Va.] (0.50 parts by weight). The components were mixed with a high shear rate for a period of 20 minutes. Morpholine (1.00 parts by weight) and triethanolamine (1.00 parts by weight) were added to the primary mixing vessel and the contents were further mixed for an additional 5 minutes. A preservative known as Dowicil 75 [DOW Chemical Inc.; Midland, Mich.] (0.15 parts by weight) was added to the primary mixing vessel and the contents were further mixed for an additional 5 minutes. A warm oil mixture (55° C., 44.50 parts by weight) was added to the primary mixing vessel and the contents were further mixed for an additional 5 minutes. The oil mixture was comprised of a homogenous blend of soybean oil [Archer Daniels Midland Co.; Red Wing, Minn.] (77.50 parts by weight); a mixture of hydrogenated fatty acids (64% stearic acid and 28% palmitic acid), known as Pristerene 4910 [Unichema International; Chicago, Ill.] (10.00 parts by weight); isostearyl alcohol, known as Prisorine 3515 [Unichema International; Chicago, Ill.] (2.50 parts by weight); and a poly(propylene glycol), average MW=1050 Da, known as Pluracol P1010 [BASF Corp.; Wyandotte, Mich.] (10.0 parts by weight). At this point the mixture was a low viscosity, opaque, emulsion with a relative coarse level of dispersion. This warm mixture was then processed through a two-stage homogenizer with an impingement pressure of about 3500 psi at a temperature of 55–65° C. The resulting emulsion was gradually cooled to a temperature of 20° C.

The emulsion had a viscosity of about 3300 cps [Brookfield, #3 spindle, 20 rpm, 20° C.] and a specific gravity of about 0.95. The emulsion did not exhibit any phase separation or sedimentation when stored at 20° C. for a period of 2 months.

Emulsion Blending. A second primary mixing vessel was charged with the emulsion prepared as described above (20° C.; 39.03 parts by weight) and water (0.63 parts by weight). The mixture was stirred at a low shear rate for 5 minutes. A defoaming agent known as Surfynol DF-210 [Air Products and Chemical Corporation; Allentown, Pa.] (0.40 parts by weight) was added to the primary vessel and the contents were stirred at a low shear rate for an additional 5 minutes. An associative thickening agent known as Rheolate 288 [Rheox Incorporated; Hightstown, N.J.] (0.13 parts by weight) was added to the primary vessel and the contents were stirred at a low shear rate for an additional 5 minutes. A titanium dioxide dispersion (27.20 parts by weight) was added to the vessel and the contents were stirred at a low shear rate for an additional 5 minutes. The titanium dioxide dispersion was prepared by mixing water (44.70 parts by weight), a dispersing aid known as Surfynol 104PA [Air Products and Chemical Corp.; Allentown, Pa.] (0.40 parts by weight), and titanium dioxide powder, known as Tronox CR-826 [Kerr-McGee Chemical Corp.; Oklahoma City] (54.90 parts by weight) with high shear in a secondary vessel for 30 minutes. An organic white pigment dispersion, a dispersion of hollow polymer spheres known as Rhopaque Ultra [Rohm and Haas Co.; Philadelphia, Pa.] (6.00 parts by weight), was added to the primary vessel and the contents were stirred at a low shear rate for an additional 5 minutes. An aqueous latex based on an acrylic polymer with a Tg>25° C., butylacrylate/methylmethacrylate copolymer latex, known as CS-4000 [Rohm and Haas Co.; Philadelphia, Pa.] (16.50 parts by weight), was added to the primary vessel and the contents were stirred at a low shear rate for an additional 5 minutes. A coalescing agent known as Texanol [Eastman Chemical Co.; Kingsport, Tenn.] (10.00 parts by weight), was added to the primary vessel and the contents were stirred at a low shear rate for an additional 5 minutes.

The resulting formulation had a pH value of 8–9, a specific gravity of 1.0–1.1. The Hegman particle size test value was 7+. The formulation had a viscosity of about 15,000 cps [Brookfield, #6 spindle, 20 rpm, 20° C.]. An aliquot of the formulation was stored without agitation in a closed container at a temperature of 20–25° C. for 2 months and no sediment formation or phase separation were observed. The color of the formulation was bright white and the odor was slight and pleasant. The formulation was readily atomized in a conventional spray paint gun. The labeling paint did-not bleed into freshly applied green edge sealant on the side of an OSB unit, but it did wet-out the surface of freshly applied green edge sealant in a manner that was sufficient to permit bonding. This formulation was very resistant to dripping on a metallic stencil and it dried to form a film that was very easily pealed or scrapped off of the metal.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for making a paint composition, comprising blending an aqueous suspension comprising an opacifying agent and a polymeric binding agent having a glass transition temperature greater than about 25° C. with an emulsion comprising a debonding agent active on metal surfaces, wherein the debonding agent is present in an amount sufficient to provide a paint comprising from about 10 to about 50 percent by weight debonding agent.

2. The method of claim 1, wherein the emulsion further comprises a viscosity enhancing agent.

3. The method of claim 2, wherein the viscosity enhancing agent comprises a polysaccharide.

4. The method of claim 1, wherein the emulsion further comprises a surfactant.

5. The method of claim 4, wherein the surfactant comprises a salt derived from morpholine and a long-chain carboxylic acid.

6. The method of claim 1, wherein the suspension further comprises a coalescing agent.

7. The method of claim 1, wherein the debonding agent comprises a vegetable oil.

8. The method of claim 1, wherein the debonding agent comprises soybean oil.

9. The method of claim 1, wherein the polymeric binding agent comprises a latex.

10. The method of claim 1, wherein the polymeric binding agent comprises a copolymer of butylacrylate and methyl methacrylate.

11. The method of claim 1, wherein the debonding agent is at least one of a vegetable oil, silicone oil or mineral oil.

12. The method of claim 1, wherein the debonding agent is at least one of soybean oil, corn oil, sunflower oil, castor oil, rapeseed oil, linseed oil, sunflower seed oil, or safflower oil.

13. The method of claim 1, wherein the opacifying agent comprises titanium dioxide.

14. The method of claim 1, wherein the opacifying agent is present in an amount sufficient to provide a paint comprising from about 0.5 to about 35% by weight opacifying agent.

15. The method of claim 1, wherein the polymeric binding agent is present in an amount sufficient to provide a paint comprising from about 3 to about 30% by weight polymeric binding agent.

16. A method for making a paint composition, comprising:

(a) preparing a first emulsion comprising water and a debonding agent active on metal surfaces, wherein the debonding agent is present in an amount sufficient to provide a paint comprising from about 10 to about 50 percent by weight debonding agent;

(b) adding a suspension comprising water and a polymeric binding agent having a glass transition temperature greater than about 25° C. to the first emulsion to provide a second emulsion; and (c) blending the second emulsion to provide the paint composition.

17. The method of claim 16, wherein the debonding agent comprises a vegetable oil.

18. The method of claim 16, wherein the debonding agent comprises soybean oil.

19. The method of claim 16, wherein the polymeric binding agent comprises a latex.

20. The method of claim 16, wherein the polymeric binding agent comprises a copolymer of butylacrylate and methyl methacrylate.

21. The method of claim 16, wherein the debonding agent is at least one of a vegetable oil, silicone oil or mineral oil.

22. The method of claim 16, wherein the debonding agent is at least one of soybean oil, corn oil, sunflower oil, castor oil, rapeseed oil, linseed oil, sunflower seed oil, or safflower oil.

23. The method of claim 16, wherein the second emulsion further comprises an opacifying agent comprising titanium dioxide.

24. The method of claim 16, wherein the second emulsion further comprises a viscosity enhancing agent.

25. The method of claim 16, wherein the second emulsion further comprises a surfactant.

26. The method of claim 16, wherein the polymeric binding agent is present in an amount sufficient to provide a paint comprising from about 3 to about 30% by weight polymeric binding agent.

27. A method for making a paint composition, comprising blending an aqueous suspension comprising an opacifying agent and a polymeric binding agent having a glass transition temperature greater than about 25° C. with an emulsion comprising a debonding agent active on metal surfaces, wherein the debonding agent comprises a vegetable oil.

28. The method of claim 27, wherein the debonding agent comprises soybean oil.

29. The method of claim 27, wherein the debonding agent is at least one of soybean oil, corn oil, sunflower oil, castor oil, rapeseed oil, linseed oil, sunflower seed oil, or safflower oil.

30. A method for making a paint composition, comprising:

(a) preparing a first emulsion comprising water and a debonding agent active on metal surfaces, wherein the debonding agent comprises a vegetable oil;

(b) adding a suspension comprising water and a polymeric binding agent having a glass transition temperature greater than about 25° C. to the first emulsion to provide a second emulsion; and (c) blending the second emulsion to provide the paint composition.

31. The method of claim 30, wherein the debonding agent comprises soybean oil.

32. The method of claim 30, wherein the debonding agent is at least one of soybean oil, corn oil, sunflower oil, castor oil, rapeseed oil, linseed oil, sunflower seed oil, or safflower oil.

* * * * *